United States Patent
Reed et al.

(10) Patent No.: US 9,952,607 B2
(45) Date of Patent: Apr. 24, 2018

(54) PRESSURE BALANCED THERMAL ACTUATOR

(71) Applicant: Senior IP GmbH, Schaffhausen (CH)

(72) Inventors: Patrick B. Reed, Franklin, MA (US); Brian L. Goeller, North Attleboro, MA (US); James M. Leithauser, East Taunton, MA (US)

(73) Assignee: Senior IP GmbH (CH)

( * ) Notice: Subject to any disclaimer, the term of this patent is extended or adjusted under 35 U.S.C. 154(b) by 105 days.

(21) Appl. No.: 15/203,618

(22) Filed: Jul. 6, 2016

(65) Prior Publication Data

US 2018/0011501 A1    Jan. 11, 2018

(51) Int. Cl.
  *G05D 23/12* (2006.01)
  *G05D 23/02* (2006.01)
  *F16K 31/00* (2006.01)

(52) U.S. Cl.
  CPC ......... *G05D 23/025* (2013.01); *F16K 31/002* (2013.01); *G05D 23/122* (2013.01)

(58) Field of Classification Search
  CPC .... G05D 23/02; G05D 23/024; G05D 23/025; G05D 23/026; G05D 23/12; G05D 23/121; G05D 23/122; G05D 23/123; G05D 23/125; F16K 31/002; F16K 3/262; F16K 41/10
  USPC ................. 251/11, 318, 325, 335.3
  See application file for complete search history.

(56) References Cited

U.S. PATENT DOCUMENTS

| | | | | |
|---|---|---|---|---|
| 1,850,963 A * | 3/1932 | Sponar | ................ | G05D 23/123 236/93 A |
| 1,969,806 A * | 8/1934 | Lambert | ............... | G05D 23/123 137/505.47 |
| 2,032,358 A * | 3/1936 | Folsom | ................ | G05D 23/121 236/99 A |
| 2,735,620 A * | 2/1956 | Bailey | ................. | G05D 23/123 236/34 |
| 3,432,141 A * | 3/1969 | Irti | ......................... | F16K 3/262 251/172 |

* cited by examiner

*Primary Examiner* — Jonathan Bradford
(74) *Attorney, Agent, or Firm* — Richard D. Harris; Greenberg Traurig, LLP

(57) ABSTRACT

A pressure balanced thermal actuator includes a flow housing having an inlet and an outlet, with the flow housing being affixed at opposing ends to two bellows housings, each of which contains a bellows. An actuation rod is operably coupled to each bellows and contains a fluid passage therewithin. When the temperature of the area surrounding the actuator increases, the pressure inside the bellows housings increases, and exerts a force on the bellows therein, compressing it. As a result, the actuation rod moves from a first position to a second position to align the fluid passage with the inlet and the outlet, enabling the controlled passage of a first fluid from the inlet, and through the fluid passage, to the outlet, to reduce the temperature of the area surrounding the valve assembly. The actuator is unaffected by changes in the ambient pressure, by working equally on two opposing bellows areas.

28 Claims, 11 Drawing Sheets

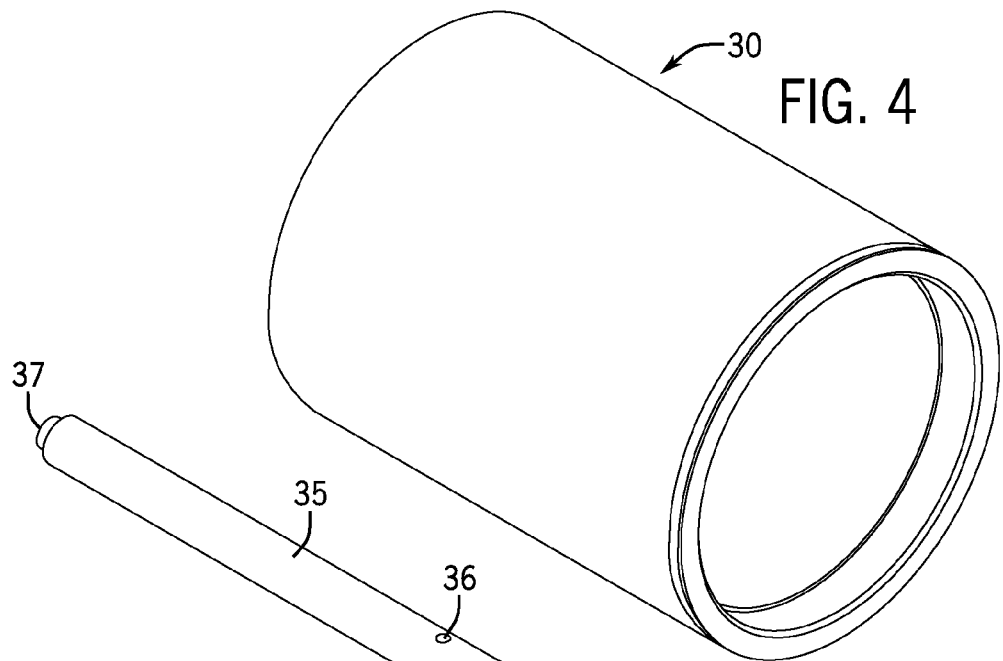
FIG. 4
FIG. 5
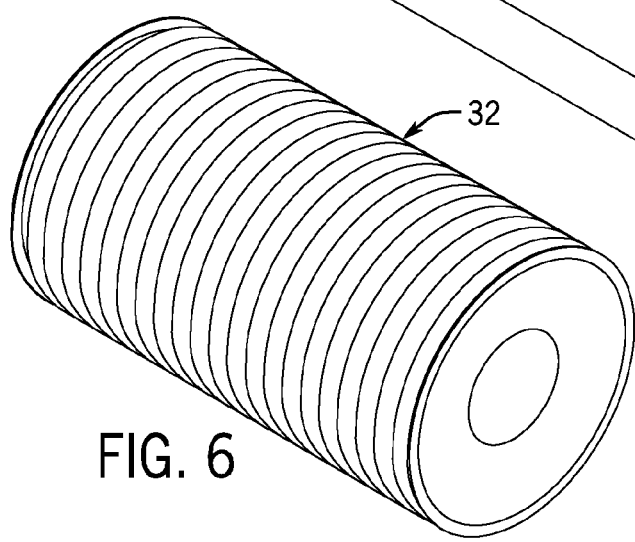
FIG. 6
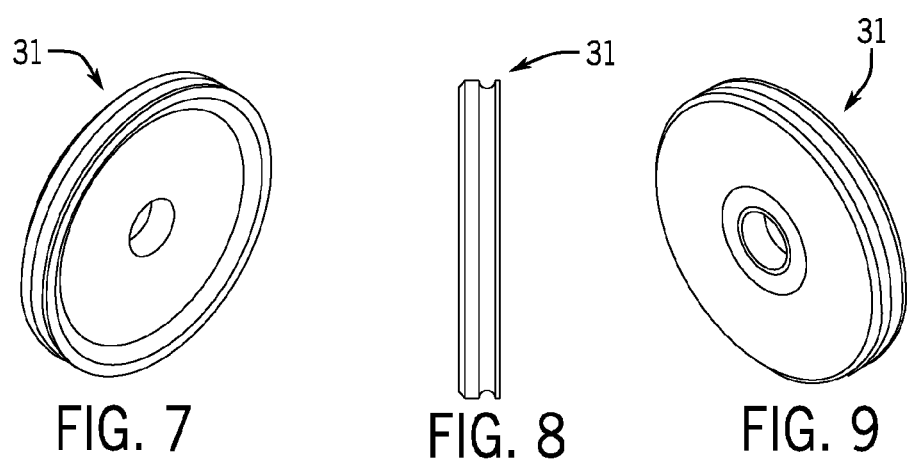
FIG. 7   FIG. 8   FIG. 9

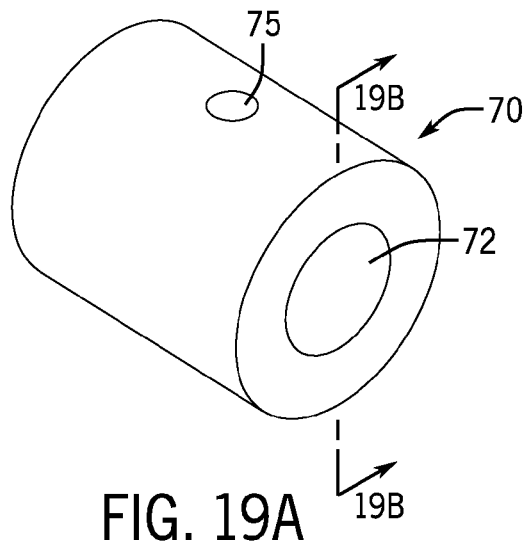
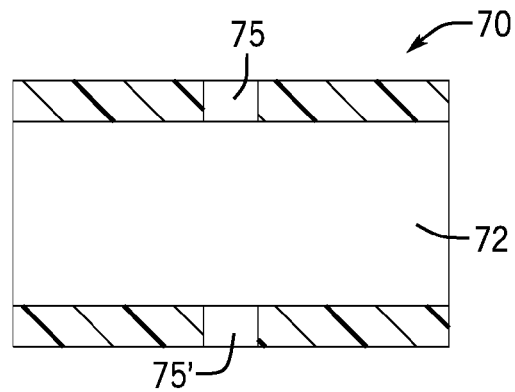
FIG. 19A    FIG. 19B
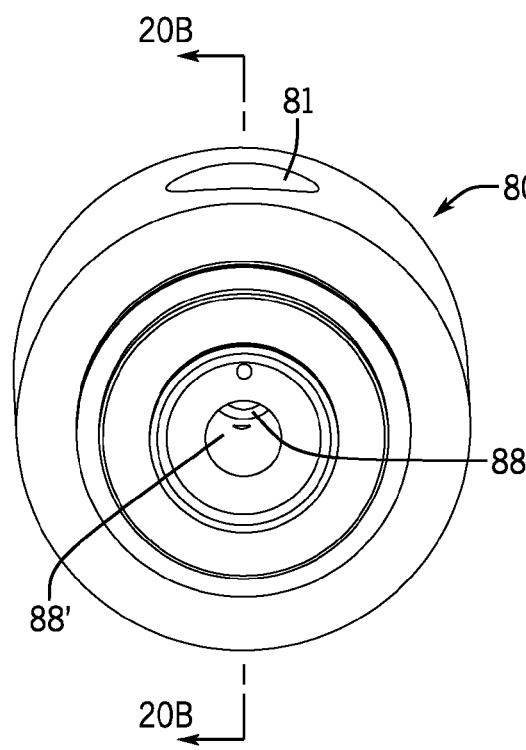
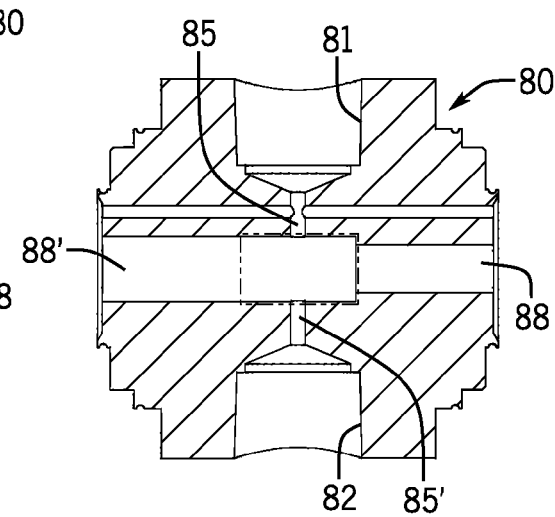
FIG. 20A    FIG. 20B urrent # PRESSURE BALANCED THERMAL ACTUATOR

FIELD OF THE DISCLOSURE

The present invention relates to valve assemblies capable of operating in high temperature conditions, and in particular, to valve assemblies having one or more bellows for regulating the flow of a fluid through a valve, to thereby affect the temperature of the surrounding environment.

BACKGROUND

Valves are known to be useful for regulating the flow of fluids. Moreover, compressible and expandable bellows structures have been known to be useful for controlling high pressure and/or high temperature fluids to enable the facilitated regulation of such valves. For example, valves can be opened and closed through the use of bellows, which can expand and/or compress based on the fluids (or lack thereof) contained within the bellows, and/or the fluids surrounding the bellows.

In an environment in which it is necessary to maintain the temperature within a certain safe operating range, valves can be used to regulate temperature by introducing a coolant or a heating fluid into the system, if the temperature begins to exceed safe operating thresholds. For example, in the context of a gas turbine, the turbine may generate electricity using heated gases. It is known that the thermodynamic efficiency of a gas turbine increases as the operating temperature increases, as higher temperature gases contain more energy, thereby producing greater work or electricity yields. At the same time, certain components of gas turbines operate most efficiently at temperatures that are lower, relative to the higher temperature gases that increase turbine efficiency. In other words, gas turbines operate within an ideal temperature range—one in which the gases are hot enough to provide high levels of efficiency, but low enough to ensure that the components of the gas turbine are not overheated, which could damage certain turbine components, or worse, render them inoperable.

In this example, it would be helpful to utilize a temperature actuated valve that serves to maintain the temperature of the turbine within a preset range. The gas turbine operates in its temperature, which temperature would slowly rise as more and more gases combust to produce work and electricity. When the temperature increases and reaches a point at which the turbine components may begin to be susceptible to damage, the temperature actuated valve would enable the release and flow of a coolant through the valve, thereby cooling the temperature of the environment, to prevent damage to the turbine components.

In a different type of environment, it might be beneficial to use a temperature actuated valve to prevent the temperature from decreasing below a certain threshold, for example, below the point where water begins to freeze. Since water expands when it freezes, water pipes and faucets can be damaged through exposure to freezing conditions. In this example, once the temperature falls and approaches the freezing point of water, a temperature actuated valve could open and allow a heated fluid or antifreeze to either warm the temperature or lower the freezing point, thereby preventing damage to the pipes or faucet.

Accordingly, there are many potential uses for a temperature actuated valve that incorporates at least two pressure-balanced bellows.

SUMMARY OF THE INVENTION

In one embodiment of the present invention, a thermal actuator valve comprises a first fluid flow housing having an inlet, an outlet, a first end and a second end opposite the first end, where the first fluid flow housing is used for the controlled passage of a first fluid between the inlet and the outlet. The valve further includes a first bellows housing having a proximal end and a distal end, with the proximal end being operably affixed to the first end of the first fluid flow housing, and a second bellows housing having a proximal end and a distal end, with the proximal end being operably affixed to the second end of the first fluid flow housing. The valve also comprises a first bellows operably positioned within the first bellows housing, the first bellows having a fixed end affixed proximate to the first end of the first fluid flow housing and a movable end opposite the fixed end. The first bellows is surrounded by a first bellows region within the first bellows housing, and the first bellows contains a medium therewithin. The valve also includes a second bellows operably positioned within the second bellows housing, the second bellows having a fixed end affixed proximate to the second end of the first fluid flow housing and a movable end opposite the fixed end. The second bellows is surrounded by a second bellows region within the second bellows housing, and, in a preferred embodiment, the second bellows region contains a second fluid therewithin. The valve further includes an actuation rod that extends internally from the movable end of the first bellows, through the first fluid flow housing, to the movable end of the second bellows, where the actuation rod has a fluid passage disposed therewithin to alternatively block, and enable, the flow of the first fluid from the inlet to the outlet. The actuation rod, the first bellows and the second bellows collectively form a reciprocating actuator capable of moving between a first position, for blocking the passage of the first fluid, and a second position, for enabling the passage of the first fluid, where the second position serves to align the fluid passage of the actuation rod with both the inlet and the outlet of the first fluid flow housing, thereby enabling the controlled passage of the first fluid to flow from the inlet through the fluid passage and into the outlet.

In one example embodiment of the present invention, the second fluid in the second bellows region within the second bellows housing comprises steam. In another example embodiment of the present invention, the medium of the first bellows region, within the first bellows housing, comprises a vacuum.

In yet another example embodiment of the present invention, the first bellows region in the first bellows housing is also filled with a certain volume of steam, in which the volume of steam in the first bellows region is a different volume than the volume of steam present in the second bellows region in the second bellows housing.

In a further example embodiment of the present invention, the second fluid within the second bellows region comprises a gas such as nitrogen gas or argon gas.

In another example embodiment, the first and second bellows are each filled with the same fluid. In a different example embodiment, the fluid within each of the first and second bellows is the first fluid.

In yet another example of a preferred embodiment, each of the first bellows and the second bellows is operably coupled to the inlet by respective first and second bellows-inlet conduits, to enable the passage of the first fluid from the inlet to and into each of the first and second bellows. In yet another embodiment, the first and second bellows have the same effective internal bellows surface area.

In a further embodiment of the present invention, the valve further comprises a first spring operably positioned between the movable end of the first bellows and either the proximal end or the distal end of the first bellows housing. In another embodiment, the valve may also comprise a second spring operably positioned between the movable end of the second bellows and either the proximal end or the distal end of the second bellows housing. In those embodiments, depending on whether the spring exerts a bias in tension or compression, at least one of the first and second springs may serve to bias the movement of the reciprocating actuator, to set a threshold pressure required to move the reciprocating actuator from one of its first and second positions to the other of its first and second positions, and potentially back to its original position. In another example embodiment of the present invention, the diameter of one of the first and second springs is larger than the diameter of the corresponding one of the first and second bellows. Likewise, suitable types and numbers of springs can be utilized.

In a another preferred embodiment of the present invention, the thermal actuator valve comprises a first fluid flow housing having an inlet, an outlet, a first end and a second end opposite the first end, where the first fluid flow housing is used for the controlled passage of a first fluid between the inlet and the outlet. In that embodiment, the actuator valve includes a first bellows housing having a proximal end and a distal end, with the proximal end being operably affixed to the first end of the first fluid flow housing, and a second bellows housing having a proximal end and a distal end, with the proximal end being operably affixed to the second end of the first fluid flow housing. In that embodiment also, a first bellows is operably positioned within the first bellows housing, the first bellows having a fixed end affixed to an internal surface in the distal end of the first bellows housing, and a movable end opposite the fixed end, the first bellows being surrounded by a first bellows region within the first bellows housing. The first bellows contains a medium therewithin. Likewise, a second bellows is operably positioned within the second bellows housing, the second bellows having a fixed end affixed to an internal surface in the distal end of the second bellows housing and a movable end opposite the fixed end, where the second bellows is surrounded by a second bellows region within the second bellows housing. In this embodiment, the second bellows contains a second fluid therewithin different from the first fluid. This embodiment further includes an actuation rod that extends internally from the movable end of the first bellows, through the first fluid flow housing, to the movable end of the second bellows, the actuation rod also having a fluid passage disposed therewithin to alternatively block and enable the flow of the first fluid from the inlet to the outlet. The actuation rod and the movable ends of the first and second bellows collectively form a reciprocating actuator capable of moving between a first position for blocking the passage of the first fluid and a second position for enabling the passage of the first fluid, in which the second position serves to align the fluid passage of the actuation rod with both the inlet and the outlet of the first fluid flow housing, thereby enabling the controlled passage of the first fluid to flow from the inlet through the fluid passage and into the outlet.

In another example embodiment of the present invention, the second fluid in the second bellows comprises steam. In another example embodiment, the medium contained within the first bellows comprises a vacuum. In yet another example embodiment in which the second bellows contains steam, the medium contained within the first bellows also comprises a certain volume of steam, in which that volume of steam preset in the first bellows is different than the volume of steam present in the second bellows. In another example embodiment, the second fluid comprises a gas such as nitrogen gas or argon gas.

In a different example of another preferred embodiment, each of the first bellows region within the first bellows housing and the second bellows region within the second bellows housing is filled with the same fluid. In another example of that embodiment, the fluid within each of the first and second bellows regions is the first fluid.

In yet another example embodiment, each of the first bellows housing and the second bellows housing is operably coupled to the inlet by respective first and second bellows housing-inlet conduits, to enable the passage of the first fluid from the inlet to and into each of the first and second bellows regions within the first and second bellows housings, respectively.

In yet another example of a preferred embodiment, the valve assembly further comprises a first spring operably positioned between the movable end of the first bellows and either the proximal end or the distal end of the first bellows housing. In yet another example embodiment, the valve assembly further comprises a second spring operably positioned between the movable end of the second bellows and either the proximal end or the distal end of the second bellows housing. In these embodiments, at least one of the first and second springs again serves to bias the movement of the reciprocating actuator, to set a threshold pressure required to move the reciprocating actuator from one of its first position and second positions, to the other of its first and second positions. In a further example embodiment, the diameter of one of the first and second springs is larger than the diameter of the corresponding one of the first and second bellows, although the number and type of springs contemplated for use remain within the scope of the invention.

BRIEF DESCRIPTION OF THE DRAWINGS

FIG. 4 is a perspective view of the first bellows housing, one component of the dual bellows thermal actuator valve assembly according to FIG. 2.

FIG. 5 is a perspective view of an actuation rod, a component of the dual bellows thermal actuator valve assembly according to FIG. 2.

FIG. 6 is a perspective view of the first bellows, a component of the dual bellows thermal actuator valve assembly according to FIG. 2.

FIG. 7 is a perspective view of the front of the first bellows end cap, a component of the dual bellows thermal actuator valve assembly according to FIG. 2.

FIG. 8 is an elevated side view of the first end cap of FIG. 7.

FIG. 9 is a perspective view of the back of the first bellows end cap of FIG. 7.

FIG. 19A is a perspective view of a bushing, for optional use within another embodiment of the first fluid flow housing (shown in FIGS. 20A-20B), to ensure that the actuation rod reciprocates smoothly between the two valve positions.

FIG. 19B is a cross-sectional view of the bushing shown in FIG. 19A, taken along line 19B-19B and looking in the direction of the arrows.

FIG. 20A is an end view of another embodiment of the first fluid flow housing for use with the bushing of FIGS. 19A-19B.

FIG. 20B is a cross-sectional view of the first fluid flow housing shown in FIG. 20A, taken along line 20B-20B and looking in the direction of the arrows.

DETAILED DESCRIPTION

Reference will now be made in detail to the preferred embodiments of the invention, examples of which are illustrated in the accompanying drawings. While the invention will be described in conjunction with the preferred embodiments, the invention is intended to cover alternatives, modifications and equivalents, which may be included within the spirit and scope of the invention as defined by the claims. Furthermore, in the detailed description of the present invention, several specific details are set forth in order to provide a thorough understanding of the present invention. However, one of ordinary skill in the art will appreciate that the present invention may be practiced without these specific details. Thus, while the invention is susceptible to embodiment in many different forms, the subsequent description of the present disclosure should be considered as an exemplification of the principles of the invention, and is not intended to limit the invention to the embodiments so illustrated.

Figure 1:
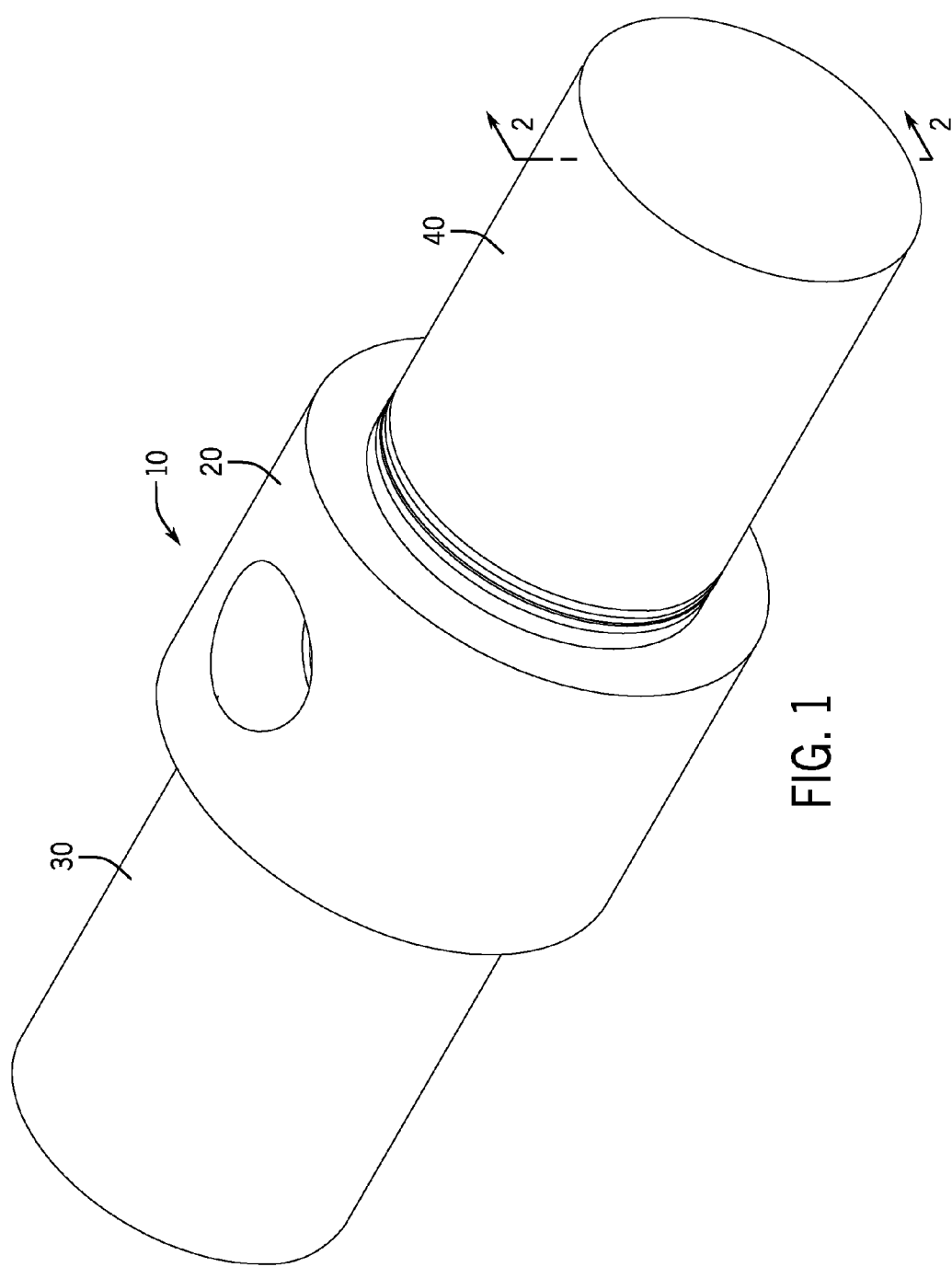
FIG. 1 is a perspective view of a dual bellows thermal actuator valve assembly.

FIG. 1 depicts a generic dual bellows thermal actuator valve assembly 10, including its externally-visible components, first fluid flow housing 20, first bellows housing 30 and second bellows housing 40. First bellows housing 30 includes proximal end 30' (see FIG. 2), which is closer to first fluid flow housing 20, and distal end 30", which is farther from first fluid flow housing 20. Likewise, second bellows housing 40 includes proximal end 40' (see FIG. 2), which is closer to first fluid flow housing 20, and distal end 40", which is farther from first fluid flow housing 20. Dual bellows thermal actuator valve assembly 10 may comprise several example embodiments, each of which includes different internal structures and/or components, and/or arrangements of those internal structures and/or components. While these different example embodiments will be discussed below, from the purely external perspective shown in FIG. 1, the differences between each such embodiment will not necessarily be visible.

One example of use for the dual bellows thermal actuator valve assembly 10 of the present invention, as noted above, is to maintain an ideal operating temperature range within a gas turbine. Again, the efficiency of a gas turbine may increase as the operating temperature increases, but certain turbine components may be damaged or become inoperable at certain elevated temperatures. In one example gas turbine, the temperature at which the turbine components may be damaged is approximately 850° F. Thus, valve assembly 10 may be used to maintain the temperature within an acceptable range, for example, between 800° F. and 850° F. In a similar fashion, the bellows within dual bellows thermal actuator valve 10 may operate most efficiently at higher pressures, but bellows components may likewise be damaged or become inoperable at certain high pressures. In one example of valve assembly 10 being used to maintain the desired range of temperature within a gas turbine, a bellows may be damaged upon experiencing pressure higher than 650 psi. Accordingly, in one example of the present invention, the bellows within valve assembly 10 may begin to move when the pressure inside or surrounding the bellows reaches 600 psi, which may be referred to as a "lift-off pressure." That pressure may correspond to a temperature of between 800° F.-850° F., which may be referred to as a "lift-off temperature." In that same example, a regulating fluid for maintaining the temperature in this ideal range may be provided at a temperature of around 800° F.

Figure 16:
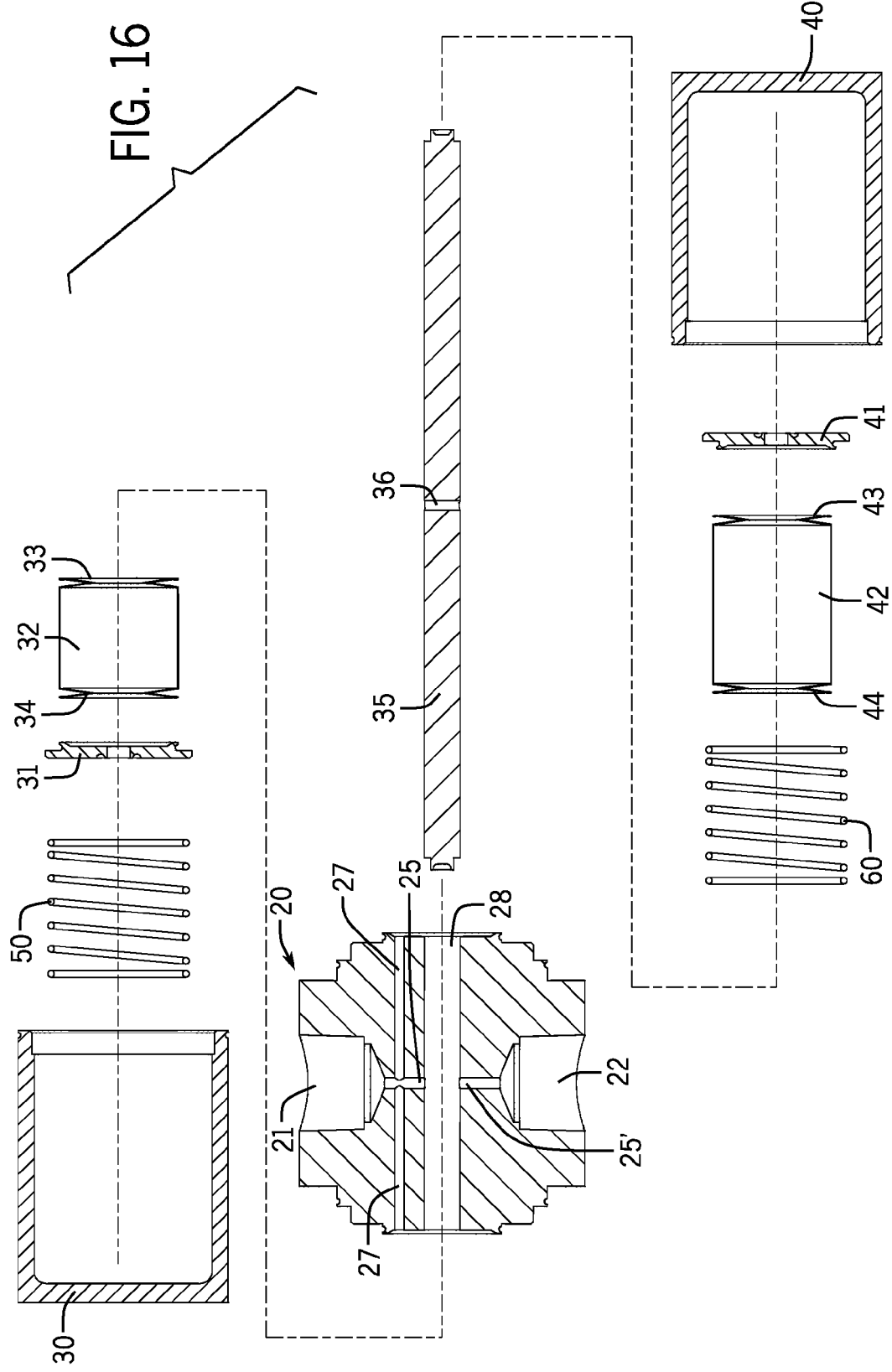
FIG. 16 is an exploded elevated, cross-sectional view of a second embodiment of the dual bellows thermal actuator valve assembly shown in FIG. 1, taken along line 2-2 and looking in the direction of the arrows, in which the valve assembly further comprises one or more springs that can cooperate with one or more of the bellows to change the threshold temperature and/or pressure at which the valve opens or closes.
Figure 17:
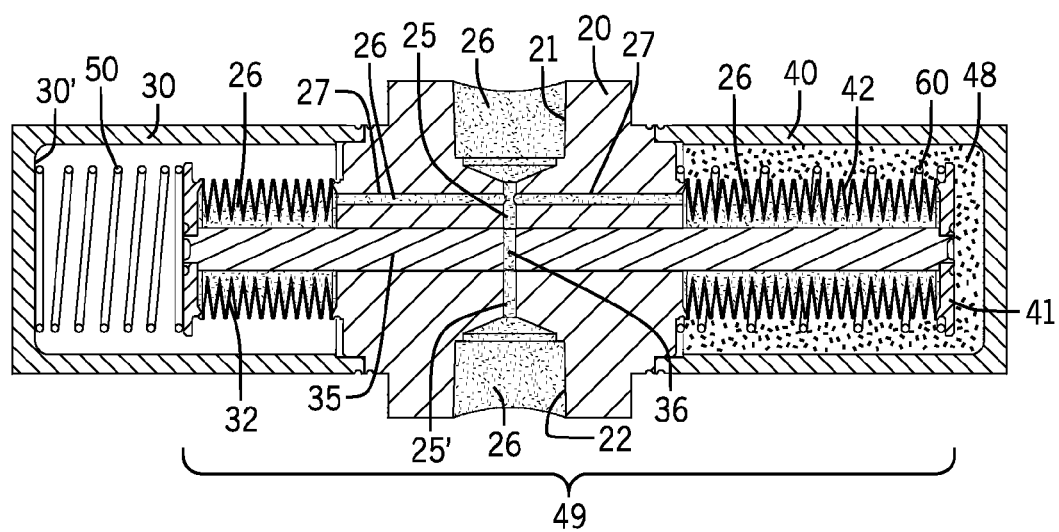
FIG. 17 is an elevated cross-sectional view of the dual bellows thermal actuator valve assembly shown in FIG. 16, in which the fluid passage within the actuation rod is aligned with the inlet and the outlet of the flow housing, thus representing the valve in its open, "first fluid flowing" position.
Figure 18:
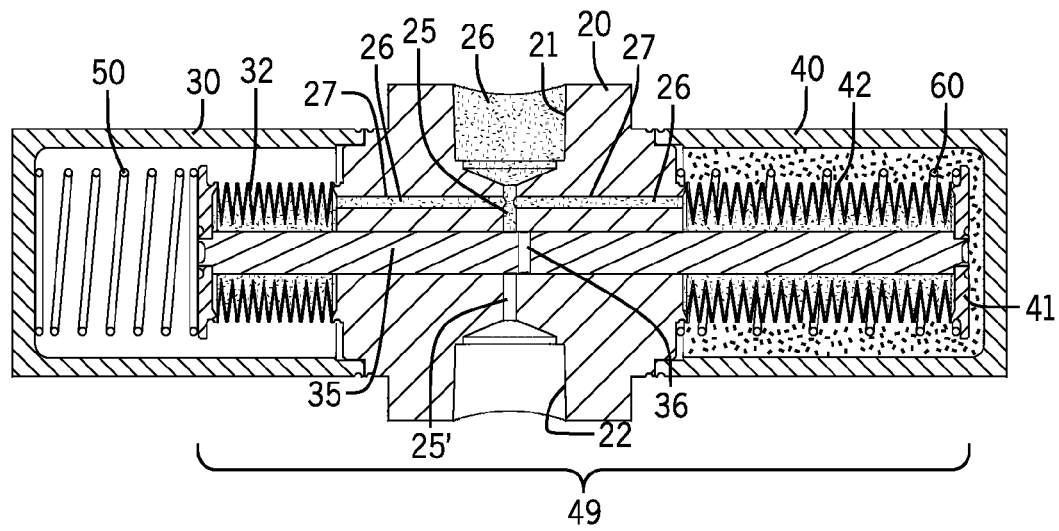
FIG. 18 is an elevated cross-sectional view of the dual bellows thermal actuator valve assembly shown in FIG. 16, in which the fluid passage within the actuation rod is out of alignment with the inlet and the outlet of the flow housing, thus representing the valve in its closed, "first fluid blocked" position.

Moreover, one of skill will appreciate that the lift-off pressure is a function of the effective area of the bellows and the sum of pre-load pressure forces provided by the spring pre-load pressure of the bellows, together with the pre-load pressure of any springs incorporated in the system (as shown, for example, in relation to FIGS. 16-18). One of skill will also understand that the lift-off temperature can be determined from the lift-off pressure and the ratio of the fluid volume (at room temperature) to the volume of the fluid reservoir (which, in the first embodiment described herein, is the volume of the first bellows region). For example, if the bellows' effective area and the sum of the pre-load pressures of the bellows and any springs are such that the lift-off pressure is 300 psi, then a fluid reservoir having a volume of 100 mL, filled with approximately 0.655 mL of water (at room temperature), that water would become steam at higher temperatures, and the resulting steam may yield a lift-off temperature of about 800° F. As another example, if the bellows' effective area and the sum of the pre-load pressures of the bellows and any springs are such that the lift-off pressure is 500 psi, then a fluid reservoir having a volume of 100 mL, filled with approximately 1.11 mL of water (at room temperature, but yielding steam at significantly higher temperatures), would result in a lift-off temperature of about 800° F. Note, however, that if the reservoir volume and water volume (for generating steam, for example, in the second bellows region) were both doubled to 200 mL and 2.22 mL, respectively, the lift-off pressure and lift-off temperature would remain unchanged—because the ratio of the reservoir volume to water volume did not change.

The above numerical figures are intended to be purely exemplary, and it will be appreciated that one of skill in the art will be able to determine, based on the needs and desired attributes of the overall system to be designed, via calculation, an appropriate volume inside each bellows, or surrounding each bellows within the respective bellows region, as well as an appropriate volume of the fluid or media contained within each bellows, or surrounding each bellows within the respective bellows region, to yield the desired temperature and pressure thresholds, for maintaining the system and any external components (e.g., gas turbine components, bellows and/or water pipes and faucets) in good working order.

Figure 2:
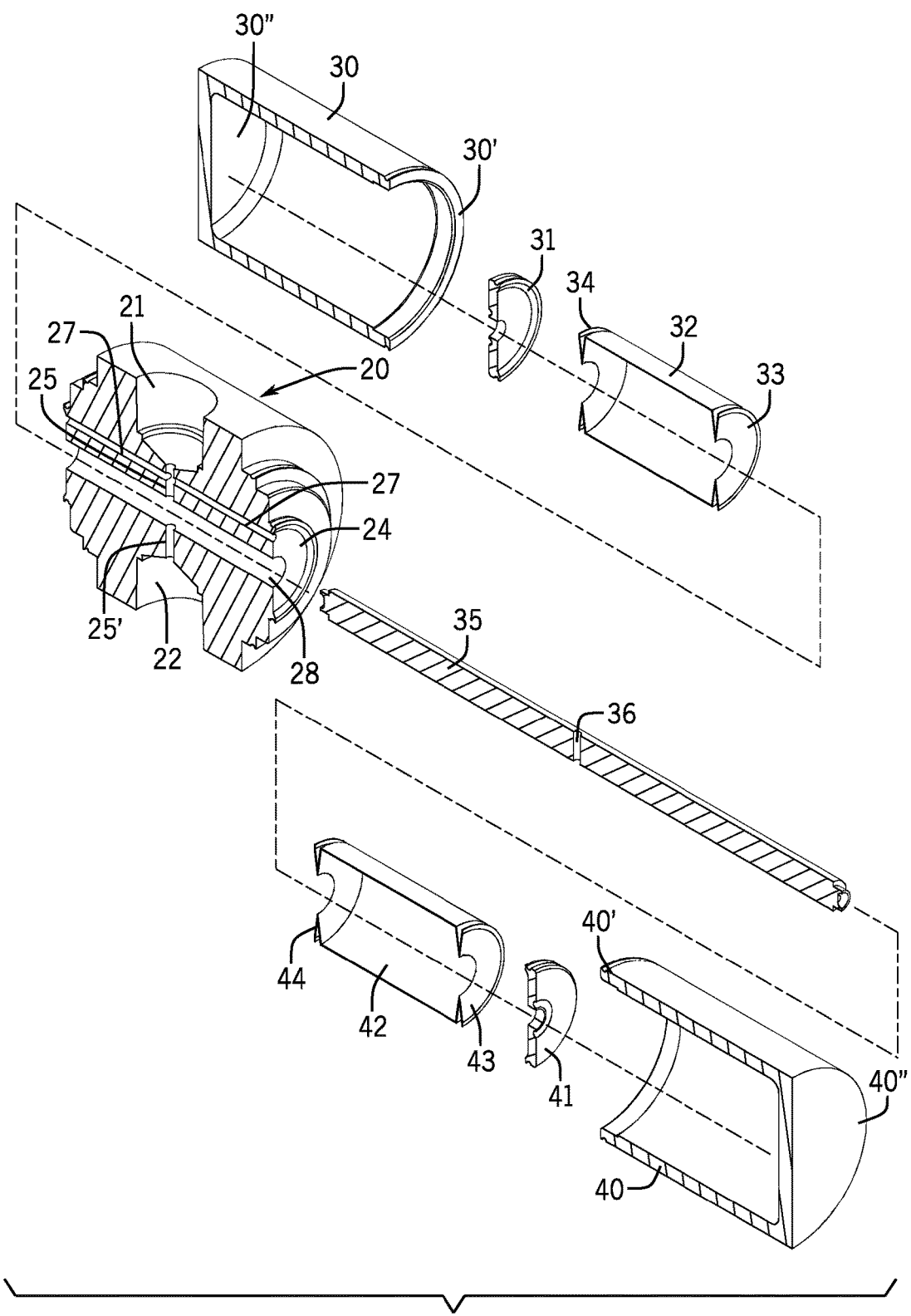
FIG. 2 is an exploded perspective, cross-sectional view of the dual bellows thermal actuator valve assembly of FIG. 1, taken along line 2-2 and looking in the direction of the arrows.
Figure 3:
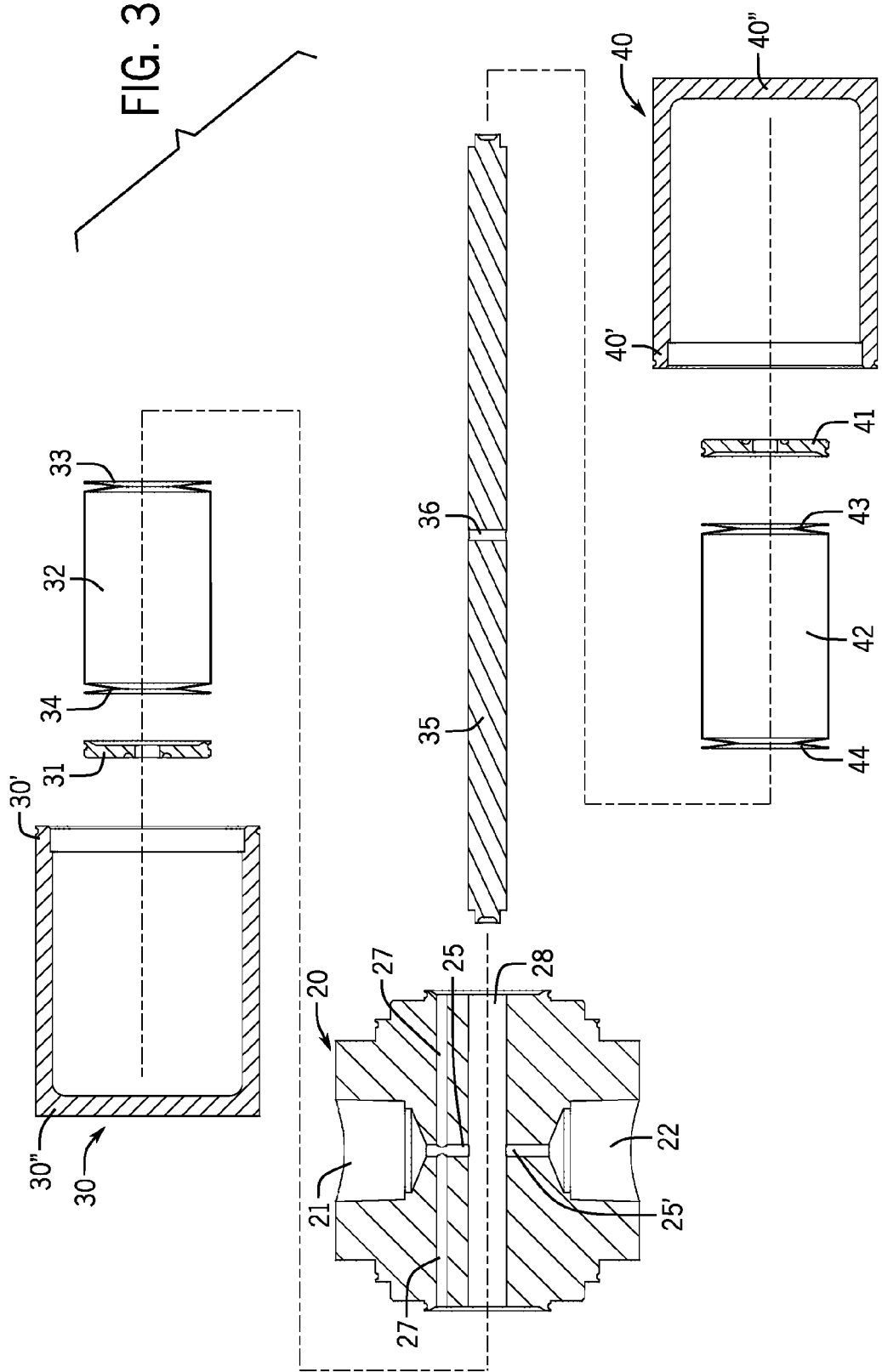
FIG. 3 is an exploded elevated, cross-sectional view of the dual bellows thermal actuator valve assembly according to FIG. 2, also taken along line 2-2 of FIG. 1 and looking in the direction of the arrows.

Referring to FIGS. 2 and 3, a first example embodiment of dual bellows thermal actuator valve assembly 10 is shown in an exploded, cross-sectional view. When valve assembly 10 is fully articulated, first bellows housing 30 houses first bellows 32, which includes fixed end 33 and movable end 34 opposite fixed end 33. Also enclosed within first bellows housing 30 is first bellows end cap 31, which is affixed to movable end 34 of first bellows 32. In the same manner, second bellows housing 40 houses second bellows 42, which comprises fixed end 44 and movable end 43 opposite fixed end 44. Also encapsulated within second bellows housing 40 is second bellows end cap 41, which is affixed to movable end 43 of second bellows 42.

Also shown in FIGS. 2-3 are cross-sectional views of first fluid flow housing 20, which, together with actuation rod 35, serves to regulate the flow of a fluid within first fluid flow housing 20—specifically, from inlet 21, through internal passages 25, 25', and shaft fluid passage 36, to outlet 22. Actuation rod 35 regulates the flow of this fluid by reciprocating within actuator guide 28 of first fluid flow housing 20. As explained in more detail below, this reciprocation is caused by the compression and expansion of first and second bellows 30, 40, respectively. When fluid passage 36 of actuation rod 35 is aligned with internal passages 25, 25'—and, thus, aligned with inlet 21 and outlet 22—a first fluid can flow freely from inlet 21, through internal passage 25, fluid passage 36 and internal passage 25' to outlet 22. In this position, the valve is "open." However, at all other times, when fluid passage 36 is not aligned with internal passages 25, 25' the fluid entering first fluid flow housing 20 at inlet 21 is blocked by actuation rod 35, and does not flow through to outlet 22. In that position, where actuation rod blocks the flow of fluid through passages 25, 25' the valve is "closed."

FIGS. 4 through 13 depict the internal components described above. Specifically, FIG. 4 shows an example of first bellows housing 30, while FIG. 5 depicts actuation rod 35, including fluid passage 36, here as shown aligned vertically in the top center of actuation rod 35. Actuation rod 35 has first and second ends 37, which are each coupled to the movable ends of first and second bellows 30, 40, respectively. More specifically, actuation rod ends 37 may be coupled either directly to movable ends 34, 43 of first and second bellows 30, 40, respectively, or they may be coupled to end caps 31, 41, which are affixed to movable ends 34, 43 of first and second bellows 30, 40, respectively, as shown in FIGS. 2 and 3.

FIG. 6 shows an example of first bellows 32. Any suitable type of bellows element may be used in the construction of valve assembly 10, including, for example, a formed bellows, an edge-welded bellows, or an edge-welded bellows having rectangular weld beads, sold under the trademark HIPRES®, which trademark is owned by the assignee of the present application. Notably while first and second bellows 32, 42 may be different in length, first and second bellows preferably have the same effective internal area—that is, the area of an axial cross-section of first bellows 32, such as movable end 34, would be the same as the area of an axial cross-section of second bellows 42, such as movable end 43. As explained in further detail below, in this first example embodiment, each of bellows 32, 42 contains the same fluid, and constructing bellows 32, 42 to have the same effective area maintains the two bellows as pressure-balanced. Since the ambient pressure around valve assembly 10 acts equally on each bellows, the pressure on each bellows cancels out. As a result, changes in the ambient pressure have no effect on the lift-off pressure or temperature.

FIGS. 7-9 depict various views of first end cap 31. First end cap and second end cap 31, 41 are substantially identical in size and shape.

Figure 10:
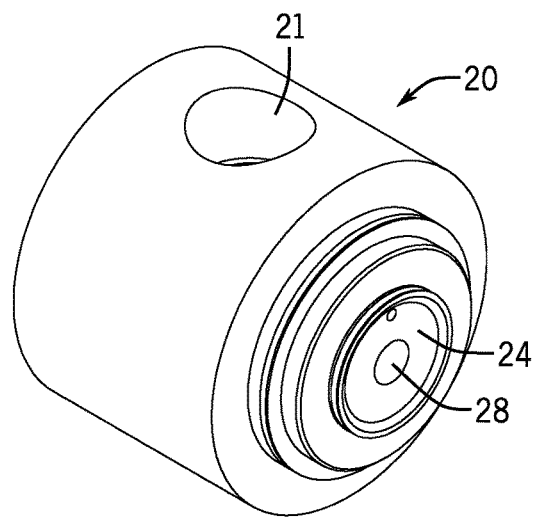
FIG. 10 is a perspective view of the first fluid flow housing, a component of the dual bellows thermal actuator valve assembly according to FIG. 2.
Figure 11:
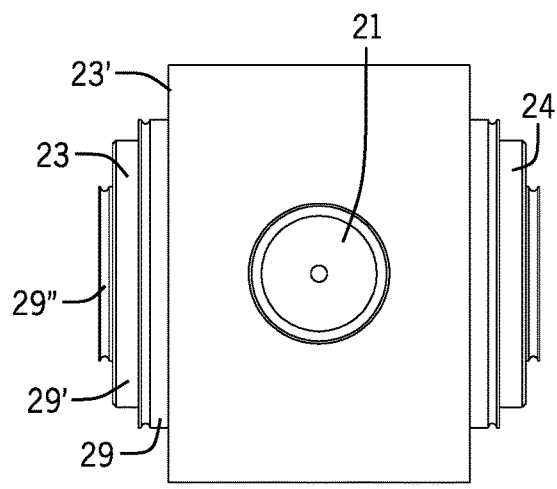
FIG. 11 is a top plan view of the first fluid flow housing of FIG. 10.
Figure 12:
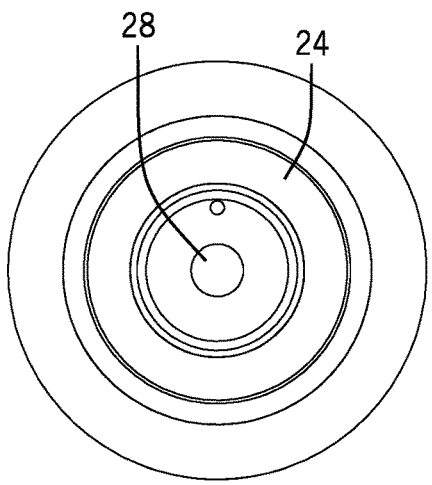
FIG. 12 is an elevated view of the second end of the first fluid flow housing of FIG. 10.
Figure 13:
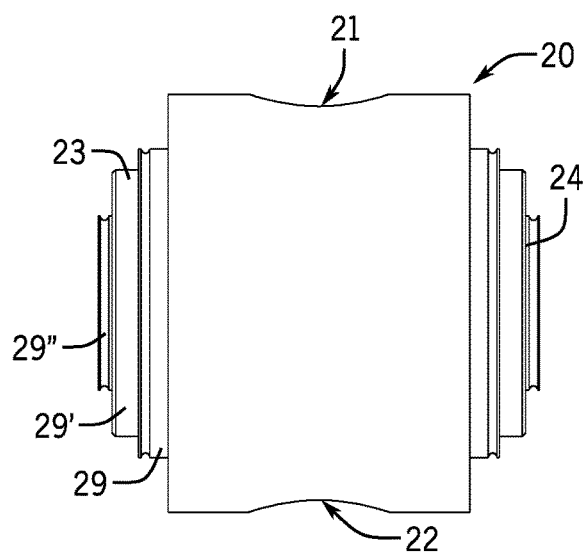
FIG. 13 is an elevated side view of the first fluid flow housing of FIG. 10.

FIGS. 10-13 depict first fluid flow housing 20 from various angles, to highlight the possible shape and arrangement of elements of an example first fluid flow housing. Preferably, inlet 21 is positioned within first fluid flow housing 20 opposite outlet 22, though it is not strictly necessary that inlet 21 and outlet 22 be so positioned. First fluid flow housing comprises first end 23 and second end 24, and each of these serves as an attachment point for the respective first and second bellows housing and corresponding bellows. For example, first end 23 of first fluid flow housing 20 contains a flat surface 23', to which first bellows housing 30 may be juxtaposed and coupled. Protruding outwardly from first end 23 of first fluid flow housing 20 are concentrically-raised ridges 29, 29', 29", any of which may serve as an attachment point for fixed end 33 of first bellows 32. Also visible in FIGS. 10 and 12 is actuator guide 28, through which actuation rod 35 is inserted during construction, and through which actuation rod 35 reciprocates to open and close the valve.

Figure 14:
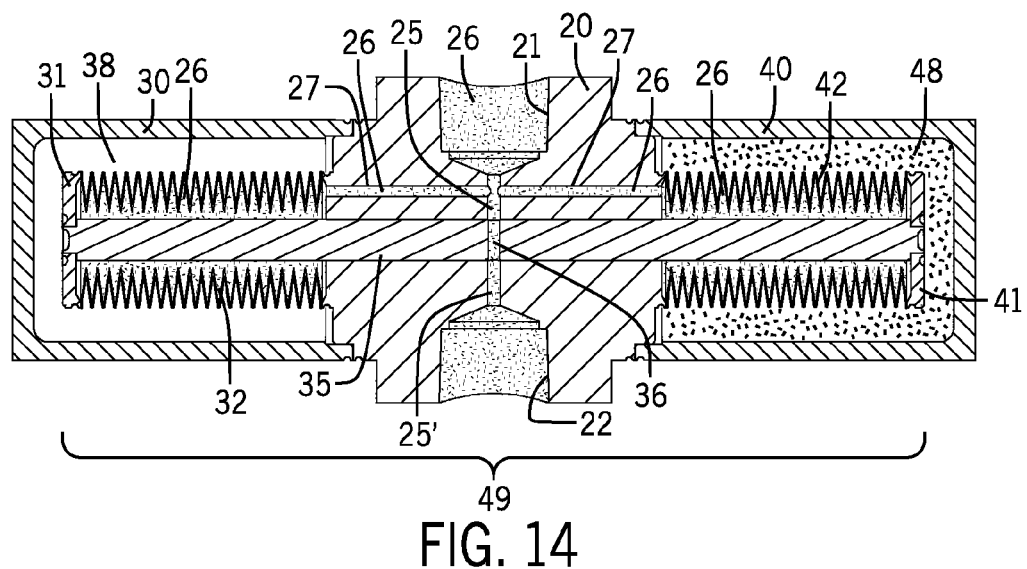
FIG. 14 is an elevated cross-sectional view of the dual bellows thermal actuator valve assembly shown in FIG. 1, taken along line 2-2 and looking in the direction of the arrows, in which the fluid passage within the actuation rod is aligned with the inlet and the outlet of the flow housing, thus representing the valve in its open, "first fluid flowing" position.
Figure 15:
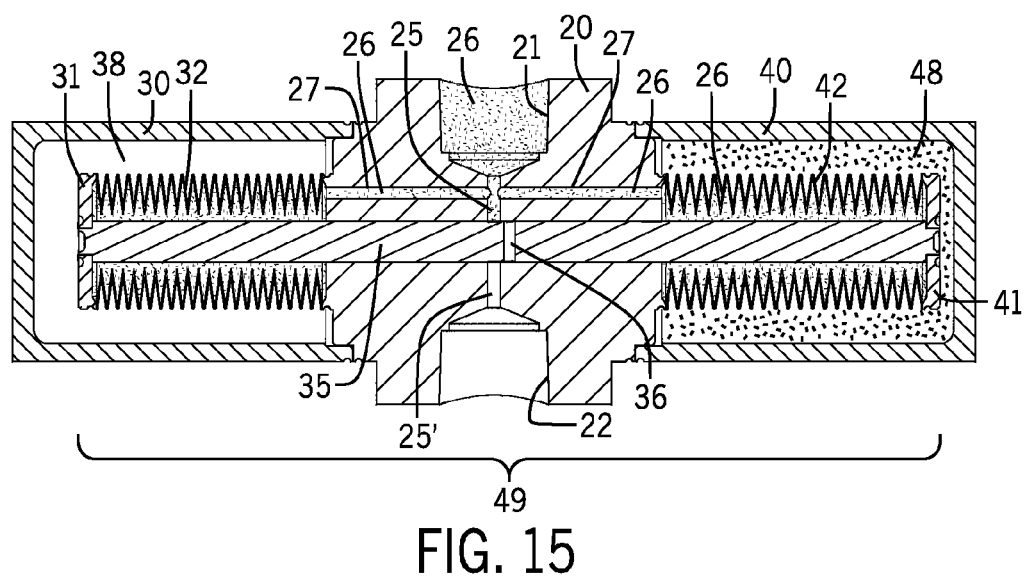
FIG. 15 is an elevated cross-sectional view of the dual bellows thermal actuator valve assembly shown in FIG. 14, in which the fluid passage within the actuation rod is out of alignment with the inlet and the outlet of the flow housing, thus representing the valve in its closed, "first fluid blocked" position.

Referring now to FIGS. 14-15, the first example embodiment of dual bellows thermal actuator valve assembly 10 is shown in an assembled, cross-sectional view. FIG. 15 shows the valve in its closed position, and FIG. 14 shows the valve in its open position. In each of FIGS. 14 and 15, a large amount of regulating fluid 26 is compiled at a fluid source (not shown) and directed through inlet 21. As shown in FIG. 15, regulating fluid 26 travels downward from inlet 21 to the upper internal passage 25, but it is blocked there by actuation rod 35, and thus prevented from flowing downward into lower internal passage 25'. At the same time, however, regulating fluid 26 is directed, via inlet conduit passages 27 to the inside of both bellows 32, 42. While stabilizing passages 27 are shown in FIGS. 14-15 as emanating from internal passage 25, one of skill in the art would understand that stabilizing passages 27 may instead directly fluidly couple inlet 21 to the inside of each of bellows 32, 42. Again, since both bellows 32, 42 have the same effective area, filling both bellows with the same regulating fluid 26 serves to maintain a pressure balance so that changes in the regulating fluid pressure have no effect on the lift-off pressure or temperature of the valve.

In FIG. 15, first bellows 32 is in its compressed position, while second bellows 42 is in its expanded position. Second bellows 42 is also surrounded by fluid 48, which is contained within bellows housing 40. In one example embodiment, fluid 48 may be steam. One of skill in the art would appreciate that fluid 48 could also be comprised of gases other than steam, for example, air, or nitrogen or argon gas. FIGS. 14-15 do not depict any fluid surrounding first bellows 32 and, in one preferred embodiment, first bellows 32 may be surrounded by a vacuum. However, one of skill in the art having the present disclosure would know that the medium surrounding first bellows—medium 38—need not be a vacuum. Rather, one of skill in the art would appreciate that valve assembly 10 moves between the closed to open to closed positions as a function of the varying amounts of pressure contained within each bellows housing 30, 40, and thus it is only necessary that fluid 48 be different in some way from medium 38. In addition to the above examples, in which fluid 48 is steam and medium 38 is a vacuum, the two could be different combinations of differing fluids (e.g., one could be steam and the other could be air, nitrogen or argon gas). As another example, fluid 48 may comprise a first amount of steam and medium 38 may comprise a second, different amount of steam.

In one preferred embodiment, for example, valve assembly 10 operates to maintain a safe operating temperature range within a gas turbine, when the temperature of the surrounding medium in which valve assembly 10 is situated begins to rise due to combusting gases. As the surrounding temperature rises, the temperature and pressure of fluid 48 (for example, steam) likewise increases. When the temperature and pressure of fluid 48 reach a certain pre-set threshold level, the pressure of fluid 48 exerts a force against second bellows 42, thereby compressing second bellows 42 and expanding first bellows 32. As second bellows 42 compresses, regulating fluid 26 within second bellows 42 is free to exit second bellows 42, and flow through inlet-conduit passages 27, through to inlet 21 and/or first bellows 32, thus maintaining the pressure balance. The result of this compression of second bellows 42 and expansion of first bellows 32 is that the combined assembly comprising first bellows 32, second bellows 42 and actuation rod 35, which may be referred to as reciprocating actuator 49, moves from its first position, shown in FIG. 15, in the leftward direction, to a second position shown in FIG. 14. In that second position, fluid passage 36 within actuation rod 35 is aligned with internal passages 25 and 25'—and, thus, aligned with inlet 21 and outlet 22—to enable regulating fluid 26 to flow freely from inlet 21 to outlet 22. As regulating fluid 26 flows through outlet 22, it may serve to stabilize and regulate the temperature surrounding valve assembly 10. In the example of a valve assembly 10 being used in a gas turbine, regulating fluid 26 would decrease the temperature and thus decrease the pressure within second bellows housing 40, thus allowing second bellows 42 to expand again, thereby returning reciprocating actuator 49 to its first, closed position, shown in FIG. 15. While the above description suggests that valve assembly 10 may begin in its closed position and move to its open position, one of skill in the art would appreciate that valve assembly 10 could likewise be designed to begin in an open position and move to a closed position before returning to its open position.

One of ordinary skill in the art would understand that any type of valve mechanism may be used with the present invention. For the sake of simplicity, the valve described herein depicts a simple, singular flow path, in which fluid travels from inlet 21, through internal passage 25, fluid passage 36 and internal passage 25', through to outlet 22. However, one of skill would understand that there may be numerous internal passages and/or fluid passages embedded within the fluid flow housing and/or the actuation rod, and that fluid may flow through many such passages instead of through one singular passage. Further, one of skill would know that the movement of the reciprocating actuator 49 can be used to open and close any type of valve mechanism. For example, a butterfly valve may be actuated by the movement of reciprocating actuator 49.

FIGS. 16-18 depict a second embodiment of the present invention—a variant on the first embodiment—in which valve assembly 10 further comprises one or more springs. For example, first bellows 32 may be coupled, either directly, or via end cap 31, to spring 50, which bears against movable end 34 of first bellows 32 (or end cap 31 affixed thereto), and which also bears against an internal surface 30' of first bellows housing 30. Spring 50 thus exerts a force against movable end 34 of first bellows 32, to thereby increase the pressure threshold required to move reciprocating actuator 49 from its first position (shown in FIG. 18) to its second position (shown in FIG. 17). In the same manner, second bellows 42 may also be coupled to spring 60. One end of spring 60 bears against second end 24 of first fluid flow housing 20, while the opposite end of spring 60 bears against the face 41' of end cap 41. In this position, spring 60 is concentric with (and thus has a larger diameter than) second bellows 42, and serves the same purpose of increasing the pressure threshold required to move reciprocating actuator 49. Notably, additional springs beyond spring 50 and spring 60 may also be used for the same purpose. Indeed, one of skill in the art would understand that the actuator may include one, two, or more than two springs, each of which may be distinct from the other springs in terms of size, shape, thickness, type, material, diameter, spring rate, etc. In their natural state, each of springs 50, 60 is longer than is depicted in FIGS. 17-18, and thus springs 50, 60 as shown in FIGS. 17-18 are partially compressed. As before, the temperature and pressure inside second bellows housing 40 increases, but the addition of springs 50, 60 require an even higher pressure threshold to be met (relative to an embodiment without springs 50 or 60), before reciprocating actuator will begin to move from its first position (shown in FIG. 18) to its second position (shown in FIG. 17). Depending on whether the springs are loaded for compression or tension, they may seat against the distal or proximal ends of the respective bellows housing.

FIGS. 19-20 show a bushing that can optionally be used internally within another embodiment of a first fluid flow housing, to ensure that actuation rod 35 reciprocates smoothly between the two positions of reciprocating actuator 49. Bushing 70, shown in FIGS. 19A-19B, describes actuator guide 72 through which actuation rod 35 would reciprocate. Bushing 70 would be incorporated within bushing passage 88' of first fluid flow housing 80, shown in FIGS. 20A-20B. Bushing 70 does not reciprocate together with actuation rod 35, but rather is maintained in a stationary position within first fluid flow housing 80. In order for fluid to flow from inlet 81 to outlet 82 of first fluid flow housing 80, bushing 70 includes internal passages 75, 75' that align with internal passages 85, 85' respectively, within first fluid flow housing 80. Accordingly, bushing 70 incorporates upper and lower internal passages 75, 75', respectively, to enable the precise flow of a regulating fluid from inlet 81 to outlet 82.

Figure 21:
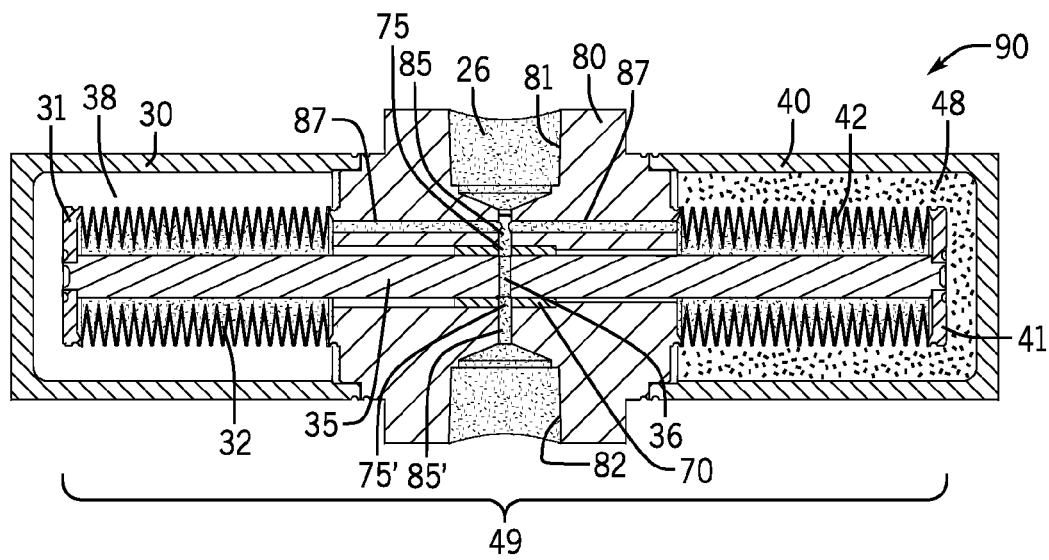
FIG. 21 is an elevated cross-sectional view of another embodiment of the dual bellows thermal actuator valve assembly shown in FIG. 1, taken along line 2-2 of FIG. 1 and looking in the direction of the arrows, in which the valve assembly incorporates the bushing and revised flow housing shown in FIGS. 19-20, with the valve shown in its open, "first fluid flowing" position.
Figure 22:
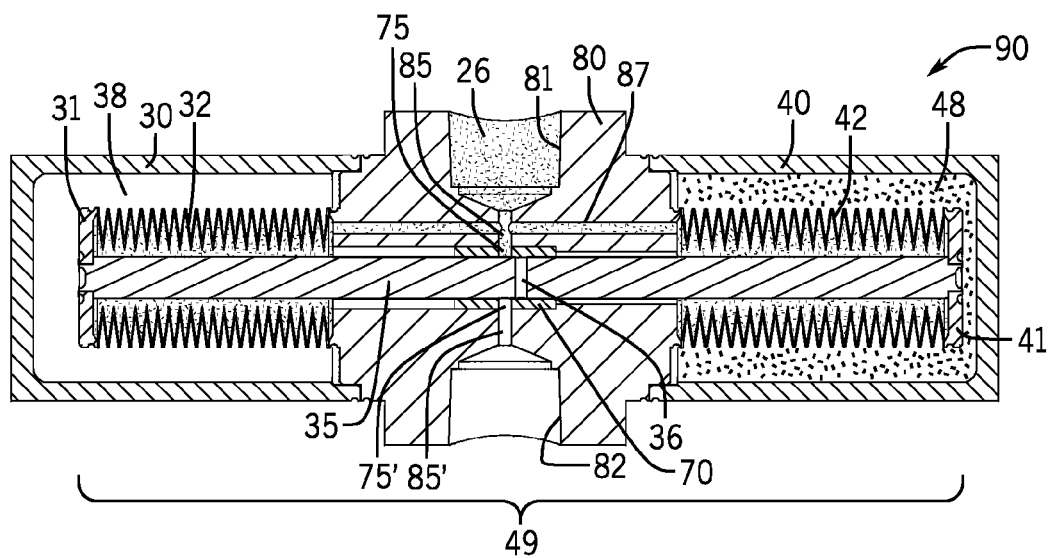
FIG. 22 is an elevated cross-sectional view of the dual bellows thermal actuator valve assembly shown in FIG. 1, taken along line 2-2 of FIG. 1 and looking in the direction of the arrows, in which the valve assembly incorporates the bushing and revised flow housing shown in FIGS. 19-20, with the valve shown in its closed, "first fluid blocked" position.

FIGS. 21-22 depict another embodiment of the invention in which bushing 70 and first fluid flow housing 80 are incorporated within valve assembly 90. In this embodiment, bushing 70 serves to ensure that actuation rod 35 reciprocates smoothly between the two positions of reciprocating actuator 49. Further, regardless of whether the valve is open (as in FIG. 21) or closed (as in FIG. 22), upper and lower internal passages 75, 75' of bushing 70 are aligned with upper and lower internal passages 85, 85', respectively, of first fluid flow housing 80.

Figure 23:
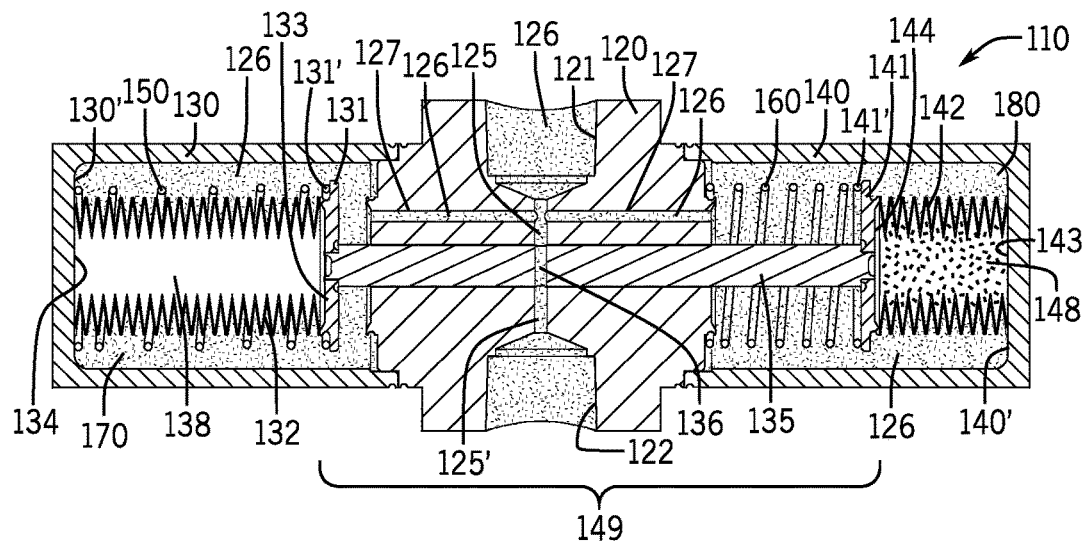
FIG. 23 is an elevated cross-sectional view of another embodiment of the dual bellows thermal actuator valve assembly shown in FIG. 1, taken along line 2-2 of FIG. 1 and looking in the direction of the arrows, with the valve in its open, "first fluid flowing" position, in which the positions of the fluid(s) and/or medium(s) inside and surrounding each bellows have been reversed, relative to the first embodiment.
Figure 24:
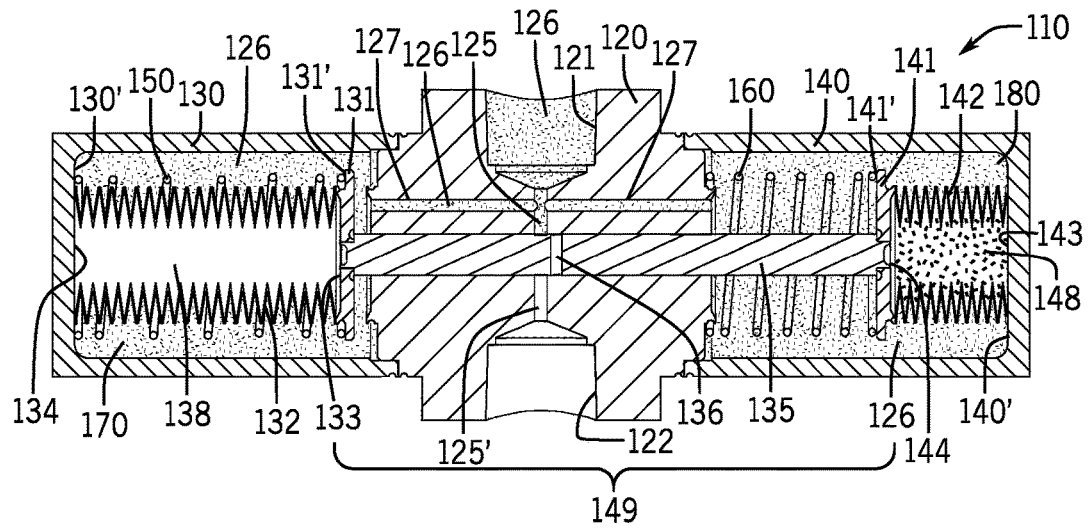
FIG. 24 is an elevated cross-sectional view of the embodiment of the dual bellows thermal actuator valve assembly shown in FIG. 23, with the valve shown in its closed, "first fluid blocked" position.

FIGS. 23-24 depict another embodiment of the present invention, valve assembly 110. In other embodiments of the invention, as noted above with regard to FIGS. 14-15, regulating fluid 26 is directed from inlet 21 to the interior of each bellows 32, 42, and the two bellows 32, 42 are each surrounded by a different medium (second bellows 42 is surrounded by fluid 48, and first bellows 32 is surrounded by first bellows region 38). In contrast, the embodiment shown in FIGS. 23-24 inverts those orientations: in FIGS. 23-24, regulating fluid 126 is directed from inlet 121 of first fluid flow housing 120 to the interior of first and second bellows regions 170 and 180, respectively. In this way, first and second bellows 132 and 142, respectively, are surrounded by first regulating fluid 126. Moreover, in this embodiment, it is the interior of first bellows 132 and second bellows 142 that respectively utilize different fluids or media, for moving reciprocating actuator 149 between its first and second positions. Specifically, in FIGS. 23-24, first bellows 132 is depicted as containing a medium 138, and second bellows 142 is depicted as containing a second fluid 148. As stated above, in one preferred embodiment, fluid 148 may be steam and medium 138 may be a vacuum. However, as was true in the earlier embodiments discussed above, it is also possible for fluid 148 and medium 138 to simply be two different types of fluids, or two different amounts of the same fluid.

The fixed and movable ends of each bellows 132, 142 can likewise be reassigned. By way of example, in the embodiment shown in FIGS. 23-24, fixed end 134 of first bellows 132 is now affixed to internal surface 130' of first bellows housing 130, and movable end 133 of first bellows 132 is now affixed to end cap 131. Likewise, fixed end 143 of second bellows 142 is affixed to internal surface 140' of first bellows housing 140, and movable end 144 of second bellows 142 is affixed to end cap 141. In this embodiment also, spring 150 is compressed within, and bears against, internal surface 130' of first bellows housing 130 and surface 131' of end cap 131. Further, spring 160 is compressed within, and bears against, the second end of first fluid flow housing 120, and surface 141' of end cap 141. Again, springs 150, 160 exert a force against first bellows 132 and second bellows 142, respectively, to thereby increase the pressure threshold required to move reciprocating actuator 149 from its first position (shown in FIG. 24) to its second position (shown in FIG. 23). Springs capable of exerting a compressive or tensile bias can be utilized, which will dictate whether they are seated against the proximal or distal end of the respective bellows housing.

The embodiment shown in FIGS. 23-24 generally operates in a similar manner as the earlier embodiments, in that an increasing temperature of the medium in which valve assembly 110 is positioned will cause the temperature and pressure of fluid 148 to increase. When the pressure of fluid 148 reaches a threshold value required to overcome the natural spring constant of first bellows 132, second bellows 142, and the forces exerted by springs 150, 160, second bellows 142 will begin to expand and first bellows 132 will begin to compress, such that reciprocating actuator 149 will move from its first, closed position (shown in FIG. 24) to its second, open position (shown in FIG. 23), in which the valve permits the flow of first regulating fluid 126, in one example, a coolant (relative to the temperature of the environment surrounding valve 110). Likewise, after the open valve has allowed regulating fluid 126 to affect the temperature surrounding valve assembly 110, the temperature and pressure within second bellows 142 will decrease, thereby returning reciprocating actuator 149 to its initial default position, closing the valve and blocking the flow of first regulating fluid 126. Notably, while valve assembly 110 is depicted in FIGS. 23-24 as having springs 150, 160, one of skill in the art would appreciate that springs 150, 160 are not strictly required in this alternative embodiment. Rather, the temperature and pressure requirements are dictated by the needs of the system to be designed, and one of ordinary skill in the art would know whether springs would be necessary to fulfill the pressure requirements in a given situation. Likewise, one of skill in the art, having the present disclosure before them, would appreciate that it would be possible to modify the embodiment shown in FIGS. 23-24 to incorporate the features of bushing 70 and revised housing 80 shown in FIGS. 19-20. Moreover, one of skill would appreciate that the use of one or more springs, of varying types, materials, spring rates and/or dimensions, can be utilized in either or both of the bellows housings, without departing from the scope of the invention.

The foregoing description and drawings merely explain and illustrate the invention, and the invention is not so limited, as those skilled in the art who have the disclosure before them will be able to make modifications and variations therein without departing from the scope of the invention.

We claim:

1. A thermal actuator comprising:
   a first fluid flow housing having an inlet, an outlet, a first end and a second end opposite said first end, said first fluid flow housing being used for the controlled passage of a first fluid between said inlet and said outlet;

a first bellows housing having a proximal end and a distal end, with said proximal end being operably affixed to said first end of said first fluid flow housing;

a second bellows housing having a proximal end and a distal end, with said proximal end being operably affixed to said second end of said first fluid flow housing;

a first bellows operably positioned within said first bellows housing, said first bellows having a fixed end affixed proximate to said first end of said first fluid flow housing and a movable end opposite said fixed end, said first bellows being surrounded by a first bellows region within said first bellows housing, said first bellows region containing a medium therewithin;

a second bellows operably positioned within said second bellows housing, said second bellows having a fixed end affixed proximate to said second end of said first fluid flow housing and a movable end opposite said fixed end, said second bellows being surrounded by a second bellows region within said second bellows housing, said second bellows region containing a second fluid therewithin; and an actuation rod that extends internally from said movable end of said first bellows, through said first fluid flow housing, to said movable end of said second bellows, said actuation rod having a fluid passage disposed therewithin to alternatively block, and enable, the flow of said first fluid from said inlet to said outlet;

said actuation rod, said first bellows and said second bellows collectively forming a reciprocating actuator capable of moving between a first position for blocking said passage of said first fluid and a second position for enabling said passage of said first fluid, said second position serving to align said fluid passage of said actuation rod with both said inlet and said outlet of said first fluid flow housing, thereby enabling the controlled passage of said first fluid to flow from said inlet through said fluid passage and into said outlet.

2. The thermal actuator according to claim 1, in which said second fluid in said second bellows region within said second bellows housing comprises steam.

3. The thermal actuator according to claim 2, in which said first bellows region within said first bellows housing comprises a vacuum.

4. The thermal actuator according to claim 2, in which said first bellows region in said first bellows housing is filled with a volume of steam, said volume of steam in said first bellows region being a volume of steam that is different than the volume of steam present in said second bellows region in said second bellows housing.

5. The thermal actuator according to claim 1, in which said second fluid within said second bellows region comprises one of nitrogen gas and argon gas.

6. The thermal actuator according to claim 1, in which said first and second bellows are each filled with the same fluid.

7. The thermal actuator according to claim 6, in which said fluid within each of said first and second bellows is said first fluid.

8. The thermal actuator according to claim 7, in which each of said first bellows and said second bellows is operably coupled to said inlet by respective first and second bellows-inlet conduits, to enable the passage of said first fluid from said inlet to and into each of said first and second bellows.

9. The thermal actuator according to claim 1, in which said first and second bellows have the same effective internal bellows surface area.

10. The thermal actuator according to claim 1, further comprising a first spring operably positioned between said movable end of said first bellows and one of said proximal end and said distal end of said first bellows housing.

11. The thermal actuator according to claim 10, further comprising a second spring operably positioned between said movable end of said second bellows and one of said proximal end and said distal end of said second bellows housing.

12. The thermal actuator according to claim 11, in which at least one of said first and second springs serves to bias the movement of said reciprocating actuator, to set a threshold pressure required to move said reciprocating actuator from one of its first and second positions to the other of its first and second positions.

13. The thermal actuator according to claim 11, in which the diameter of one of said first and second springs is larger than the diameter of the corresponding one of said first and second bellows.

14. The thermal actuator according to claim 1, in which the thermal actuator comprises a valve.

15. A thermal actuator comprising:

a first fluid flow housing having an inlet, an outlet, a first end and a second end opposite said first end, said first fluid flow housing being used for the controlled passage of a first fluid between said inlet and said outlet;

a first bellows housing having a proximal end and a distal end, with said proximal end being operably affixed to said first end of said first fluid flow housing;

a second bellows housing having a proximal end and a distal end, with said proximal end being operably affixed to said second end of said first fluid flow housing;

a first bellows operably positioned within said first bellows housing, said first bellows having a fixed end affixed to an internal surface in said distal end of said first bellows housing, and a movable end opposite said fixed end, said first bellows being surrounded by a first bellows region within said first bellows housing, said first bellows containing a medium therewithin;

a second bellows operably positioned within said second bellows housing, said second bellows having a fixed end affixed to an internal surface in said distal end of said second bellows housing and a movable end opposite said fixed end, said second bellows being surrounded by a second bellows region within said second bellows housing, said second bellows containing a second fluid therewithin;

an actuation rod that extends internally from said movable end of said first bellows, through said first fluid flow housing, to said movable end of said second bellows, said actuation rod having a fluid passage disposed therewithin to alternatively block and enable the flow of said first fluid from said inlet to said outlet said actuation rod and said movable ends of said first and second bellows collectively forming a reciprocating actuator capable of moving between a first position for blocking said passage of said first fluid and a second position for enabling said passage of said first fluid, said second position serving to align said fluid passage of said actuation rod with both said inlet and said outlet of said first fluid flow housing, thereby enabling the controlled passage of said first fluid to flow from said inlet through said fluid passage and into said outlet.

16. The thermal actuator according to claim 15, in which said second fluid in said second bellows comprises steam.

17. The thermal actuator according to claim 16, in which the medium contained within said first bellows comprises a vacuum.

18. The thermal actuator according to claim 16, in which the medium contained within said first bellows comprises a volume of steam, said volume of steam being a volume of steam that is different than the volume of steam present in said second bellows.

19. The thermal actuator according to claim 15, in which said second fluid comprises one of nitrogen gas and argon gas.

20. The thermal actuator according to claim 15, in which each of said first bellows region within said first bellows housing and said second bellows region within said second bellows housing is filled with the same fluid.

21. The thermal actuator according to claim 20, in which said fluid within each of said first and second bellows regions is said first fluid.

22. The thermal actuator according to claim 21, in which each of said first bellows housing and said second bellows housing is operably coupled to said inlet by respective first and second bellows housing-inlet conduits, to enable the passage of said first fluid from said inlet to and into each of said first and second bellows regions within said first and second bellows housings, respectively.

23. The thermal actuator according to claim 15, in which each of said first and second bellows has the same effective internal bellows area.

24. The thermal actuator according to claim 15, further comprising a first spring operably positioned between said movable end of said first bellows and one of said proximal end and said distal end of said first bellows housing.

25. The thermal actuator according to claim 24, further comprising a second spring operably positioned between said movable end of said second bellows and one of said proximal end and said distal end of said second bellows housing.

26. The thermal actuator according to claim 25, in which at least one of said first and second springs serves to bias the movement of said reciprocating actuator to set a threshold pressure required to move said reciprocating actuator from one of its first position and second positions to the other of its first and second positions.

27. The thermal actuator according to claim 25, in which the diameter of one of said first and second springs is larger than the diameter of the corresponding one of said first and second bellows.

28. The thermal actuator according to claim 15, in which the thermal actuator comprises a valve.

* * * * *